United States Patent [19]

Cohen et al.

[11] Patent Number: 4,678,337

[45] Date of Patent: Jul. 7, 1987

[54] LASER BASED GAGING SYSTEM AND METHOD OF USING SAME

[75] Inventors: David A. Cohen; David M. Papurt, both of Cambridge, Mass.

[73] Assignee: Laser Metric Systems, Inc., Cambridge, Mass.

[21] Appl. No.: 730,200

[22] Filed: May 3, 1985

[51] Int. Cl.$^4$ ............................................. G01B 11/02
[52] U.S. Cl. .................................... 356/387; 356/386
[58] Field of Search .............................. 356/384–387, 356/356

[56] References Cited

U.S. PATENT DOCUMENTS 3,480,141 11/1969 Rock, Jr. ............................. 356/385
4,063,103 12/1977 Sumi ......................................... 372/3

Primary Examiner—R. A. Rosenberger
Assistant Examiner—Crystal D. Cooper
Attorney, Agent, or Firm—Burns, Doane, Swecker and Mathis

[57] ABSTRACT

The present invention relates to a method of and apparatus for measuring the width of an object. The object is moved across a first beam and a photodetector produces a signal indicating when the object is eclipsing the beam. An interferometer is trained on a device for moving the object across the beam and is used to calculate the distance the moving device travels while the object is eclipsing the beam. From that distance, the width of the object can be calculated.

25 Claims, 6 Drawing Figures

LASER BASED GAGING SYSTEM AND METHOD OF USING SAME

BACKGROUND OF THE INVENTION

The present invention relates to a laser based system for gaging the outside dimension of an object and, more particularly, to a laser based gaging system using imaging and interferometry.

Laser based gaging systems are generally known in the art and are useful in situations where high accuracy is required or where an object to be measured cannot be touched because it is, for example, sensitive, hot, toxic, or the like.

Optical gaging systems are grouped into two major categories. The first category includes systems using imaging or measurement of light reflected from an object to be measured or from a background surface. Such systems include electronic camera based vision systems, beam scanning systems and optical comparators, and profiling systems using front or oblique lighting. The second category includes systems using imaging or measurement of light transmitted past, and not "eclipsed", by the object to be measured. Systems in the second category include gaging microscopes, optical comparators using rear lighting methods, and beam scanning systems using beam interruption methods.

A search of the prior art failed to uncover any prior art reference which discloses the laser based gaging system of the present invention. However, several prior art patents were uncovered which disclose various laser based optical gaging systems.

For example, U.S. Pat. Nos. 3,856,412 and 4,199,259 disclose optical gaging systems wherein a laser beam is scanned by a rotating mirror across a beam splitter, from which one half of the beam is used to calibrate the system and the other half of the beam is eclipsed by a stationary object to be measured. The eclipsed beam is projected onto a photocell which produces a signal from which the diameter of the object is calculated.

U.S. Pat. No. 4,063,103 discloses an electron beam exposure apparatus wherein a pattern is formed on a workpiece disposed on a carriage movable in both X and Y directions. A laser interferometer is used to measure the distance over which the carriage moves.

U.S. Pat. Nos. 3,765,774; 3,905,705; and 4,129,384 disclose optical gaging systems wherein a laser beam is scanned by a rotating mirror across a stationary object. The beam is eclipsed by the object and imaged onto a photodetector. The detector signal is then used to calculate the object size.

U.S. Pat. No. 3,743,428 discloses an optical measuring device wherein a laser beam is eclipsed by a stationary test object and then subjected to a grid to divide the beam into a series of pulses which are imaged by a rotating scanning mirror onto a slit and photodetector. The size of the test object is calculated by counting the number of pulses that pass through the slit.

The above-described prior art devices have a number of common disadvantages which limit precision. Those devices have a large depth of field that limits their accuracy due to blurring of the detected edge. In addition, they are affected by the varying amount of the light beam that grazes the object. Furthermore, their beam eclipse signatures are as wide as the scanning beam. Such systems also require an accurate angular-to-linear scan conversion lens.

U.S. Pat. Nos. 3,765,774 and 3,905,705 disclose devices the accuracy of which is limited by errors in alignment and angular velocity of the scanning mirrors.

U.S. Pat. Nos. 3,856,412 and 4,199,259 are limited by the accuracy and stability of their calibration scales and gratings.

U.S. Pat. No. 4,129,384 describes a dual beam method for measuring object dimensions. The accuracy of that method depends on factors associated with the beams, which are required to be of equal energy, co-aligned and highly symmetric. Additional disadvantages of the dual beam method are its complexity and high cost.

OBJECTS AND SUMMARY OF THE INVENTION

In view of the foregoing limitations and shortcomings of the prior art devices, as well as other disadvantages not specifically mentioned above, it should be apparent that there still exists a need in the art for an improved laser gaging system and method of laser gaging. It is, therefore, a primary object of this invention to fulfill that need by providing a simplified and accurate laser gaging apparatus and method of using the same.

More particularly, it is an object of this invention to provide a laser gaging system that requires a minimum of moving optical parts.

It is another object of this invention to provide a laser gaging system having no moving parts that require critical adjustment.

A further object of the present invention is to provide a method for gaging that is easy to use, yet provides an extremely accurate measurement.

Yet another object of the present invention is to provide a laser gaging system wherein precise placement of the object to be measured is not critical.

It is still another object of the present invention to provide a laser gaging system involving the eclipsing of a laser beam by an object to be measured, wherein reflections of the laser beam from the object do not affect the accuracy of the system.

A further object of the present invention is to provide a laser based interferometry gaging system that is accurate to within a fraction of the wavelength of the laser beam.

Briefly described, these and other objects are accomplished according to the invention by providing a method of and system for gaging the outside diameter of an object using laser interferometry. The system includes a beam eclipsing subsystem comprising a collimated laser beam that propagates through an imaging system and a narrow slit onto an optical detector. The imaging system serves to produce a magnified, possibly inverted, replica (on the slit) of the light field pattern near the object. A linear translator carries the object to be gaged across the collimated laser beam so that the projection of the beam onto the detector is eclipsed by the object. A second laser beam is reflected from a reflector on the linear translator and incorporated into an interferometer system that ia adapted to measure the displacement of the linear translator. Thresholding electronics connected to the optional detector start and stop a fringe extinction counter connected with the interferometer to count fringes in an inteference pattern to accurately determine the distance traveled by the linear translator during the period the first laser beam is eclipsed. The fringe count is then used to accurately calculate the diameter of the object.

In operation, a test object is placed on the linear translator, which is then moved across the first laser beam in a manner so as to eclipse the beam. The first detector detects the initial moment of eclipsing of the beam by the object and signals the interferometer to start measuring the distance moved by the object. When the object leaves the beam, the detector signals the interferometer to stop measuring the distance moved by the object. From the distance actually measured, the dimension of the object in the direction of travel is calculated.

With the foregoing and other objects, advantages and features of the invention that will become hereinafter apparent, the nature of the invention may be more clearly understood by reference to the detailed description of the invention, the appended claims and to the several views illustrated in the attached drawings.

DETAILED DESCRIPTION OF A PREFERRED EMBODIMENT

Figure 1:
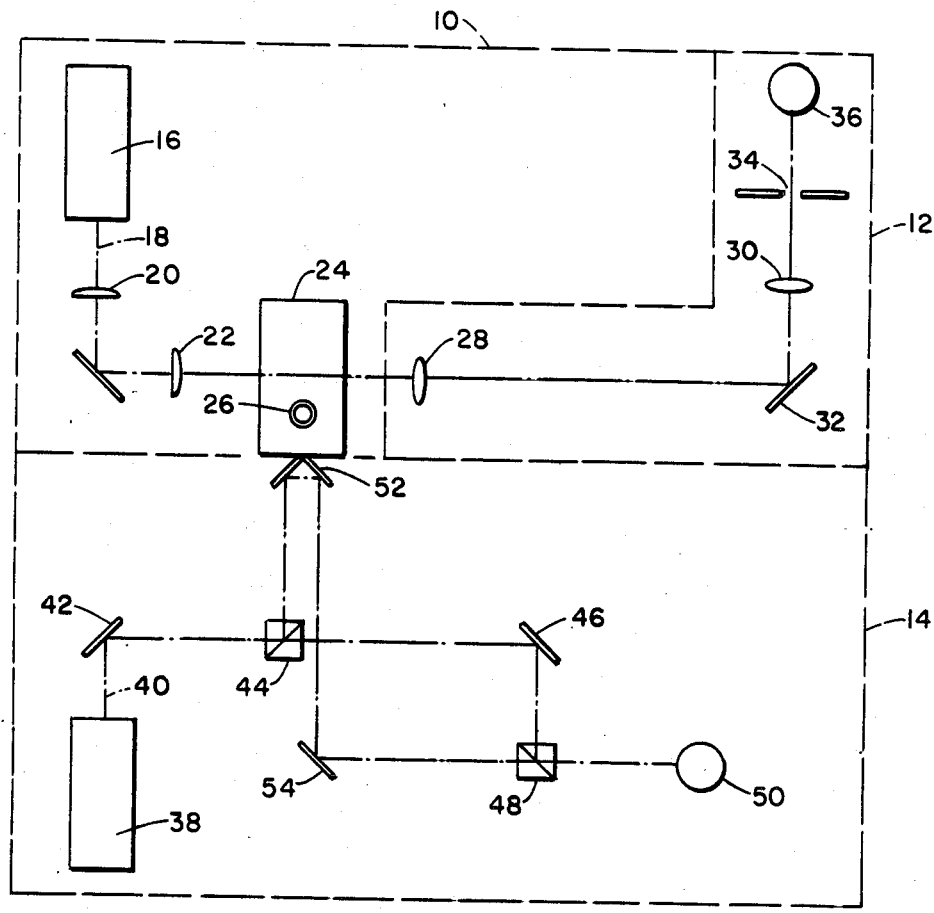
FIG. 1 is a schematic representation of the system according to the present invention.

Referring now in detail to the drawings wherein like parts are designated by like reference numerals throughout, there is illustrated in FIG. 1 a schematic diagram of the laser gaging system according to the present invention.

A beam eclipsing subsystem 10 is shown in schematic relation to an imaging subsystem 12 and an interferometer system 14, each subsystem being depicted in dashed lines.

The beam eclipsing subsystem 10 comprises a laser 16, such as a conventional low power helium-neon device. A laser beam 18 is passed through a series of beam shaping lenses 20, 22 to form a collimated light beam of small cross-section described hereinafter as an Optical Reference Zone (ORZ). The ORZ "cross-section" is the shape (e.g., $e^{-2}$ intensity contour) of the beam in a plane perpendicular to the beam. The length of the cross-section in the direction perpendicular to the translator surface (vertical) is dictated by the accuracy of part fixturing. In practice, it is larger than the vertical uncertainty in part location. Typically, the cross-section extends 0.007 inch vertically and 0.001 inch horizontally near the object.

A linear translator 24 moves back and forth in a direction substantially perpendicular to the direction of propagation of beam 18 and is designed to move an object 26 to be measured across the beam of light 18. As the object 26 is moved into the path of the light beam 18 or ORZ, the beam 18 is eclipsed.

Figure 3:
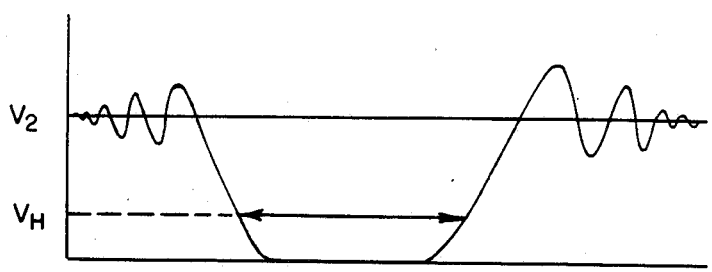
FIG. 3 is a graph of the output of the photodetector in the beam eclipsing subsystem of the present invention.

The imaging system 12 comprises lenses 28, 30 and mirror 32 which direct the propagated beam 18 onto a narrow vertical slit 34 of about 5 micrometers ($5 \times 10^{-6}$ meters) in width. A photodetector 36 is placed a short distance behind the slit 34 and is designed to emit a voltage signal $V_2$ (see FIG. 3) represetative of the intensity of the light beam 18 passing through slit 34.

Thus, when the object 26 is positioned outside the ORZ, the output signal $V_2$ of detector 36 is at a relative maximum, and when the object 26 is in the ORZ, thus eclipsing beam 18, the output signal $V_2$ of detector 36 is at a relative minimum. Thus, signal $V_2$ can be used to determine when the object 26 is eclipsing the beam 18.

By using signal $V_2$ in conjunction with the interferometer linear measuring system 14 trained on the linear translator 24, the distance that the linear translator 24 moves while the beam 18 is eclipsed can be calculated. That distance is the dimension of the object 26.

Accurate measurement of the object 26 requires that the ORZ eclipse zone, i.e., the ORZ region first entered and last exited by the object, be precisely imaged. The image of the eclipse zone is a moving light/dark transition or shadow boundary created by the interception of the beam by the surface of the moving object 26. The eclipse zone contains light that proceeds unperturbed toward the imaging system 12. It also contains light that has reflected by the object 26. The unperturbed light and the reflected light combine to create an interference pattern due to their high degree of spatial coherence.

Figure 2:
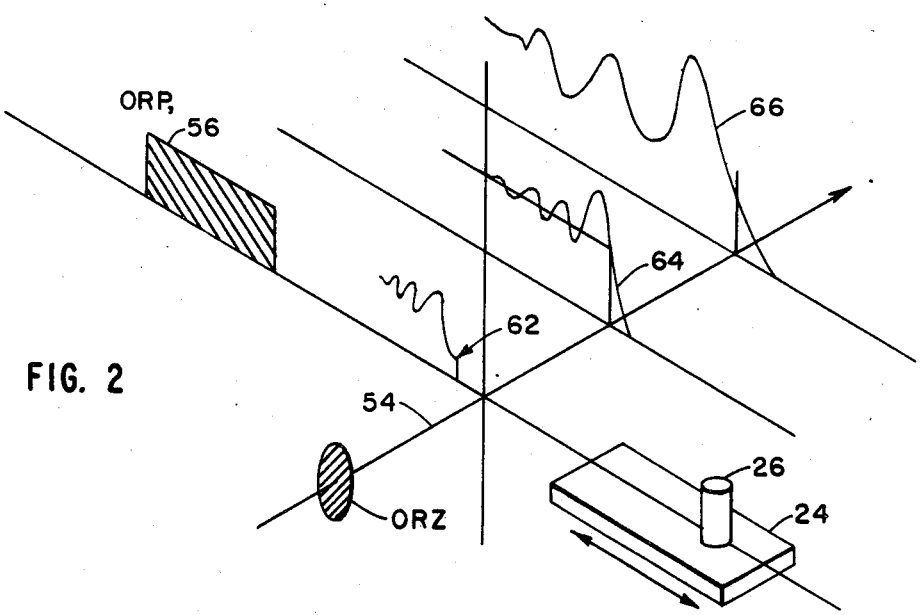
FIG. 2 is a three dimensional graphic representation showing light waves propagating from the test object.

Referring to FIG. 2, the plane in the eclipse zone perpendicular to the propagation axis 54 (i.e., the axis in the direction of propagation of beam 18) that includes the ORZ point first entered by the object is defined herein as the Object Reference Plane 56 (ORP). In the ORP, the light distribution includes a "step" change 62 in intensity that coincides with a perfect geometric shadow of the object 26. As the light propagates from this plane, the shadow boundary spreads out slightly due to diffraction. See lines 64 and 66 in FIG. 2. In practice, it has been found that accurate and repeatable measurements of part dimensions are possible by imaging a plane slightly in front of the ORP. Typically, by imaging a plane (object plane) about 0.002 inch in front of the ORP, measurements accurate to $+/-5$ millionths of an inch are possible.

The imaging system 12 produces a diffraction limited, high resolution (200 cycles per millimeter) magnified replica of the light field distribution in the object plane. The image (replica) plane is coincident with the plane of the slit 34. Referring the slit to the object plane reduces its effective size by the magnification factor. This allows small regions of the object plane to be sampled. For example, a magnification factor of 15 allows a 5 micrometer ($5 \times 10^{-6}$ meters) slit to sample a 10 microinch wide region. This imaging method produces signatures as narrow as 200 millionths of an inch in width allowing for highly accurate measurements. The slit length is matched to the vertical uncertainty in object placement.

Signal $V_2$ thus represents the light intensity at the image plane as detected by the photodetector 36 behind slit 34. By adjusting a threshold voltage $V_H$ associated with the signature $V_2$ (see FIG. 3), the distance measured between threshold points will vary slightly about the actual dimension. The level of $V_H$ used to determine the object dimension can be ascertained by calculations or, more easily, by calibrating the device with an object 26 of known size.

One method of calibrating the system is to select $V_H$ such that the distance measured between threshold points is exactly the object dimension. A second method of calibrating the system is to select $V_H$ such that the distance measured between threshold points deviates from the object dimension by a known amount.

The signal $V_2$ is used in conjunction with the interferometer system 14 which comprises a laser 38 and an optics system shown schematically in FIG. 1. The laser 38 is a frequency stabilized low power laser, such as a helium-neon device operating in a single longitudinal mode, the output of which comprises a beam 40 which is reflected by mirror 42 and projected onto a beam splitter 44. Half the beam 40 is deflected toward the linear translator 24. The other half of the beam 40 passes through the beam splitter 44 and is reflected by mirror 46 and a second beam splitter 48 and then projected onto a photodetector 50. That portion of the beam 40 deflected by the beam splitter 44 is retro-reflected from a cube-corner prism reflector 52 mounted on the linear translator 24 onto a mirror 54 from which it is also reflected onto the photodetector 50.

The superpositioning of both halves of beam 40 creates an interference pattern on the detector 50. By means of conventional interferometry, the distance that the linear translator moves can be accurately determined. To reduce noise caused by vibrations from the translator 24, it is important to maintain the translator at a constant velocity while the object 26 is eclipsing the beam 18.

Figure 4:
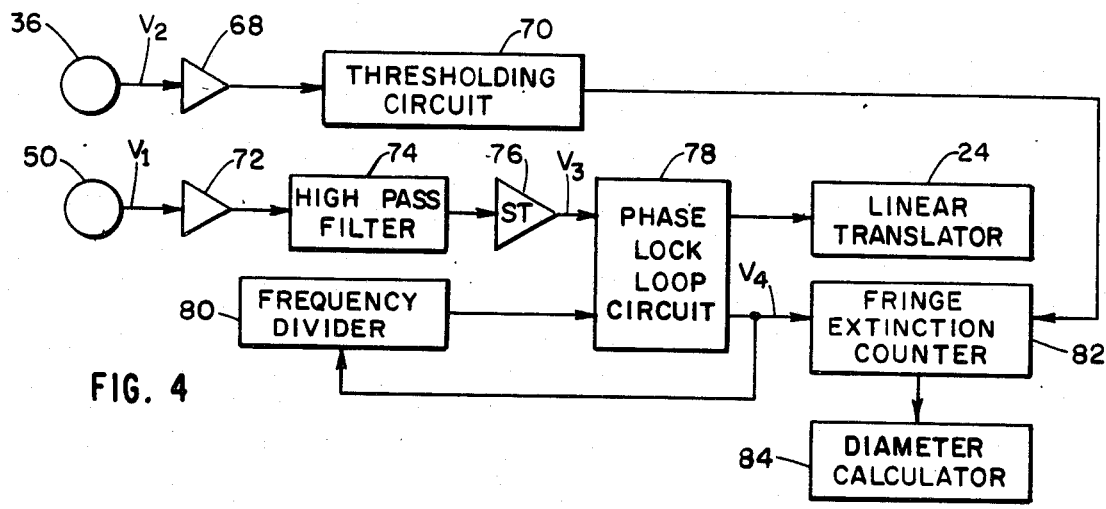
FIG. 4 is a schematic representation of the electronic components of the present invention.

Referring now to FIG. 4, the various components of the electronic circuit will be described operationally. Photodetector 36 produces the signal $V_2$ which is amplified by amplifier 68 and transmitted through a thresholding circuit 70. Such thresholding circuits are well known in the art and are used to determine when the signal $V_2$ drops below $V_H$ as discussed above.

Figure 5:
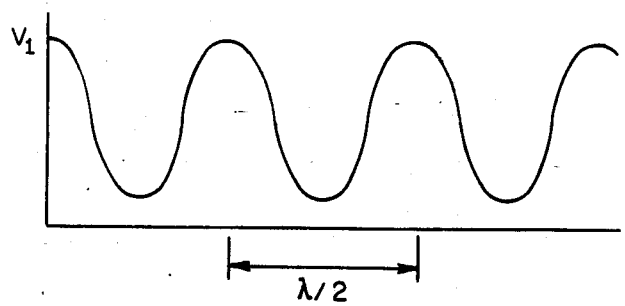
FIG. 5 is a graph of the output of the photodetector of the interferometer of the present invention.
Figure 6:
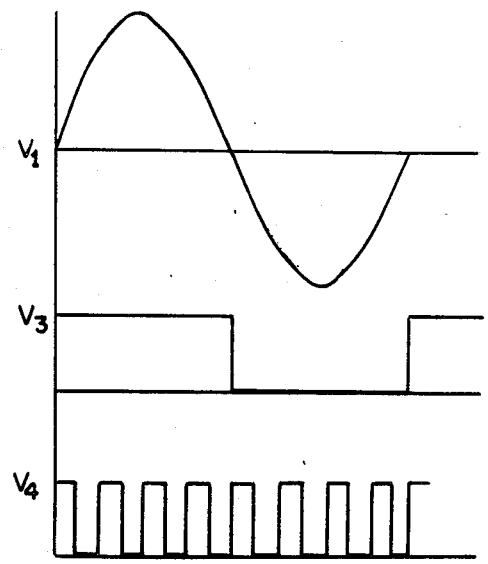
FIG. 6 depicts graphs of the voltage signals at various points in the circuit shown in FIG. 4.

The output from the thresholding circuit 70 is used to control the fringe extinction counter 82 of the interferometer. A signal $V_1$ from photodetector 50 represents the light projected onto the photodetector 50 and is amplified by amplifier 72. See $V_1$ in FIG. 5. The signal $V_1$ is then passed through a high pass filter 74 which eliminates the DC offset. See the top graph in FIG. 6. The signal is then passed through a Schmitt trigger 76 from which a square wave signal $V_3$ emerges, which is also shown in FIG. 6. The square wave signal $V_3$ has a wavelength equal to the wavelength of the input signal $V_1$, which is about 12.5 microinches ($12.5 \times 10^{-6}$ inches). The input signal $V_1$ has a wavelength equal to one half of the wavelength of laser 38 which is known to one part per million and is corrected for temperature and atmospheric pressure.

Because the resolution capability of the interferometer is limited to approximately one-half the wavelength, the signal $V_3$ is passed through a phase lock loop (PLL) circuit for frequency multiplication. The multiplier circuit includes a PLL circuit 78, such as a conventional XR 215 manufactured by Exar, and a frequency divider 80, such as a standard 74LS93 circuit, in the feedback loop of the PLL circuit. The PLL circuit is also used as a feedback control system to achieve constant velocity motion of the translator 24.

The output $V_4$ of the PLL circuit is a square wave with a frequency multiplied by a factor equal to the frequency division factor of the divider 80. An important feature of this circuit is not only the frequency multiplication characteristic, but also its phase or edge locking nature. That allows each positive transition or edge of $V_4$ to represent one-eighth (in case of multiplication by eight) of the wavelength of the input wave. Thus, each rising edge can be counted by a digital counter and thus represents about 1.56 microinches of travel of the translator 24.

The output $V_4$ of te PLL circuit is then directed to a digital counter 82, such as a 74LS161. The digital counter 82 counts positive transitions of $V_4$ when activated to do so by the thresholding electronics 70. A diameter calculator 84 is then used to convert the fringe count to a figure representing the actual dimension of the object 26.

In operation, a test object 26 is placed on the linear translator 24, which is then moved across the first laser beam in a manner so as to eclipse the beam. The first detector 36 detects the intitial moment of eclipsing of the beam by the object and signals the interferometer to start measuring the distance moved by the object. When the object leaves the beam, the detector 36 signals the interferometer to stop measuring the distance moved by the object. From the distance actually measured, the dimension of the object in the direction of travel is calculated.

Although only preferred embodiments are specifically illustrated and described herein, it will be appreciated that many modifications and variations of the present invention are possible in light of the above teachings and within the purview of the appended claims without departing from the spirit and intended scope of the invention.

What we claim is:

1. A method of measuring, comprising the steps of:
   providing a laser beam;
   moving an object to be measured through the beam;
   imaging onto a first plane a light pattern formed in a second plane, said light pattern including a diffraction pattern caused by interaction of the beam and the object, said second plane being adjacent the plane perpendicular to the beam that is first entered by the object;
   sampling the intensity of the light pattern in the first plane over a fraction of its extent said fraction being sufficiently small to enable resolution of the diffraction pattern;
   measuring the distance traveled by the object while the intensity is below a threshold value; and
   calculating the dimension of the object in the direction of movement of the object from the distance traveled by the object.

2. The method according to claim 1, wherein the object is moved through the beam on a linear translator in a direction transverse to the direction of propagation of the beam.

3. The method according to claim 2, further comprising the steps of:
   monitoring the beam with a photodetector that emits a voltage signal proportional to the intensity of detected light;
   determining when the voltage signal crosses a threshold voltage; and
   controlling a means for measuring the distance traveled by the object so that the distance is measured only when the voltage signal is less than the threshold voltage.

4. The method according to claim 3, further comprising the step of calibrating the threshold voltage by moving an object of a known dimension through the beam and setting the threshold voltage so that the distance measured yields the proper dimension of the object.

5. The method according to claim 2, wherein the distance traveled by the object is measured by creating an interference pattern by combining an interferometer beam reflected from the linear translator with a local oscillator beam and measuring changes in the interference pattern.

6. The method according to claim 2, further comprising the step of controlling the movement of the object with a phase lock loop circuit.

7. The method according to claim 3, further comprising the step of subjecting a signal from the photodetector to thresholding electronics to determine when the object is moving through the beam.

8. A method of measuring an object, comprising the steps of:
providing a laser beam;
moving the object through the beam;
monitoring the movement of the light/dark transition created by the interaction of the object with the beam by imaging, onto an image plane, a diffraction light pattern formed by said interaction in a plane adjacent to the plane perpendicular to the beam that is first entered by the object;
sampling the diffraction light pattern in the image plane over a fraction of its extent with a photodetector, said fraction being sufficiently small to enable observation of the diffraction light pattern;
determining the distance that the object has moved beginning when the photodetector signal goes below a first threshold level upon the object entering the beam and ending when said signal goes above a second threshold level upon the object leaving the beam; and
calculating the dimension of the object in the direction of the object from the distance traveled by the object.

9. The method according to claim 8, wherein the step of monitoring the beam is effected by imaging the adjacent plane with a high resolution and diffraction limited imaging system.

10. The method according to claim 9, wherein the adjacent plane is about 0.002 inches in front of the plane that is first entered by the object.

11. The method according to claim 9, wherein the adjacent plane is imaged onto a plane containing a vertical slit.

12. The method according to claim 8, wherein the monitoring step comprises sampling the laser beam with a vertical slit.

13. The method according to claim 8, wherein the monitoring step comprises imaging the plane containing a cross-section of the beam onto a second plane containing a vertical slit.

14. A device for measuring an object, comprising:
a laser beam;
means for moving the object through the beam;
an object reference plane being the plane perpendicular to the beam that is first entered by the object;
means for imaging a light pattern formed in a second plane onto a first plane, said second plane being adjacent the object reference plane, and said light pattern including a diffraction pattern caused by interaction of the beam and the object;
limiting means interposed at the first plane for limiting the extent of the beam that passes through the first plane;
a photodetector that emits a signature representative of the light received arranged behind said limiting means for detecting the portion of the beam that passes through the limiting means;
said limiting means being sufficiently small so as to enable resolution of the diffraction pattern by the photodetector;
thresholding electronics associated with the photodetector for determining when the signal from the photodetector is below a threshold;
means for determining a distance traveled by the object while the photodetector signal is below the threshold; and
means for calculating the dimension of the object in the direction of movement from the distance traveled.

15. The measuring device according to claim 14, wherein the limiting means comprises a vertical slit.

16. The measuring device according to claim 15, wherein the distance determining means comprises means for creating an interference pattern by combining a second beam reflected from the moving means with a local oscillator beam and means for measuring changes in the interference pattern.

17. The measuring device according to claim 16, further comprising means for using a signal produced by the distance determining means for controlling the object moving means.

18. The measuring device according to claim 14, further comprising a frequency multiplying phase lock loop circuit for controlling movement of the object moving means.

19. The measuring device according to claim 14, wherein the shape of the laser beam has an $e^{-2}$ intensity contour, said beam being larger in the vertical direction than the vertical uncertainty of the object location.

20. The measuring device according to claim 15, wherein the slit is 5 micrometers wide.

21. The device for measuring an object according to claim 14, wherein said distance determining means and said calculating means comprises:
a second laser beam;
a beam splitting means for splitting the second laser beam and reflecting half said beam onto the means for moving the object and transmitting the remainder of the beam toward a second photodetector;
means on the means for moving the object for reflecting the second beam to the second photodetector upon which the second laser beam recombines to form an interference pattern;
means for combining the threshold electronics signal with a signal from the second photodetector to calculate the distance traveled by the means for moving the object while the signal from the first photodetector is below the threshold; and
means for calculating the dimension of the object in the direction of travel of the object based upon the distance traveled.

22. The device according to claim 21, further comprising a phase lock loop circuit for controlling movement of the linear translator.

23. The method according to claim 8, wherein the spatial light pattern is sampled by an aperture placed in front of the photodetector.

24. The method according to claim 1, wherein the intensity of the imaged pattern is sampled by an aperture placed in front of a photodetector.

25. The method according to claim 24, wherein the moving spatial light pattern is imaged by a high resolution imaging system.

* * * * *